Nov. 19, 1957　　V. E. MATULAITIS　　2,813,966
ROUGH AND FINISH MACHINING WITH STEPPED ELECTRODE
Filed March 25, 1955

INVENTOR.
Victor E. Matulaitis.
BY
Maxwell K. Murphy
ATTORNEY.

United States Patent Office 2,813,966

Patented Nov. 19, 1957

2,813,966

ROUGH AND FINISH MACHINING WITH STEPPED ELECTRODE

Victor E. Matulaitis, Franklin, Mich., assignor to Elox Corporation of Michigan, Clawson, Mich.

Application March 25, 1955, Serial No. 496,780

5 Claims. (Cl. 219—69)

This invention relates to improvements in the art of arc-machining, sometimes called "spark-machining," "metal disintegrating," or "electrical discharge machining."

In the practice of the art of arc-machining, fineness of surface finish, accuracy of dimension and speed of cutting are constantly being sought. Apparatus and circuitry for obtaining precise dimensional control and excellent surface finish have been developed. Apparatus and circuitry for providing fast removal of stock have also been developed, and combinations for achieving all of these desirable results with one machine or apparatus are now coming into use.

It is, however, quite generally true that relatively fast stock removal is accompanied by relatively rough surface finish, and dimensional control is apt to suffer when the high power inputs necessary for rapid stock removal are used.

It is, of course, fundamental that machining of a cavity in a workpiece by electrical discharge necessarily requires that the machined hole be larger than the electrode, because there must be clearance between the electrode and the workpiece to provide the arc-gap across which the eroding discharge takes place.

The physical magnitude of the arc-gap is determined primarily by the power expended in the individual electrical discharges which perform the machining operation. This power dissipation is usually expressed in watt-seconds, but any other convenient unit of electrical energy measurement may be used. The nature of the workpiece and the type and disposition of coolant used also affect the size of the arc-gap. Gaps vary in length from less than .0001 inch to .020 inch in accordance with different conditions of stock, coolant and circuitry. Rate of stock removal increases with lengthening of gap, but surface roughness also increases.

It has been found that, in general, the best surface finish attainable with any specific arc-machining circuit will be attained with circuit parameters which accomplish a rate of metal removal of approximately $\frac{1}{10}$ to $\frac{1}{20}$ of the maximum attainable rate of removal for that particular circuit.

From the foregoing, it is apparent that the normally desirable characteristics of high metal removal rate and fine surface finish are incompatible. An arc-machining operation carried on under conditions providing high rate of metal removal will invariably require a wider arc gap than that normally desired and will produce a surface finish rougher than that desired. Use of a relatively wide gap is particularly hazardous in cases where electrodes of intricate cross section are used for producing intricate sections or contours, because there is in most instances a loss of resolution or definition. The desired faithfulness of reproduction and smoothness of surface finish, therefore, can be obtained only by the expenditure of time, which is sometimes prohibitive in length.

It is the principal object of my invention to provide a method and means for obtaining fine surface finish and high overall cutting rate.

A secondary object is to improve the art of arc-machining by the use of a stepped electrode which will perform roughing and finishing operations during a single pass through the workpiece.

From the above discussion, it will be clear to one skilled in the art that both high stock removal rate and fine surface finish can not be obtained by the use of a single electrode of uniform cross-section. In practicing my invention, I provide an electrode of proper cross-sectional shape with one or more reduced portions along the length thereof, the reduced portions being fed into the workpiece with high power input and with consequent large arc-gaps being produced and the larger portions being fed under conditions of lower power and smaller gaps.

For a better understanding of the invention, reference is made to the accompanying drawings wherein reference characters have been used to designate like parts referred to herein.

Because the type of apparatus, circuitry, etc., used in modern arc-machining practice has been described in several recently issued patents and in my copending applications, I will omit specific details thereof in the interest of brevity, and make reference to the following patents and applications for a fuller disclosure of such subject matter: McKechnie et al. Patent No. 2,501,954; and Matulaitis applications Serial Nos. 338,789, filed February 25, 1953, now Patent No. 2,769,078, dated October 30, 1956, and 361,730, filed June 15, 1953.

Figure 1:
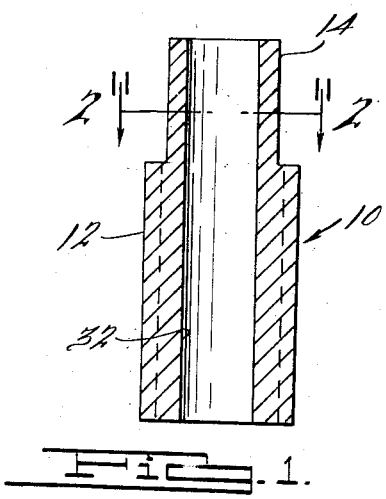
Fig. 1 is a longitudinal sectional view of an arc-machining electrode of conventional form having a typical cross-sectional shape.
Figure 2:
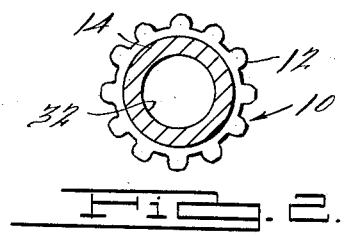
Fig. 2 is a sectional view along line 2—2 of Fig. 1.

Figs. 1 and 2 illustrate a typical electrode such as might be used for machining an extrusion die for extruding a gear shaped blank, the blank being cut into sections which constitute pump rotors or the like. It is desired that the part produced by the die be of required size and excellent surface finish so that no machining is necessary; therefore, the die itself must be of comparable size and finish.

The electrode 10 is machined of free-machining brass or equivalent material. The portion 12 is of gear shape as shown in Fig. 2, and the portion 14 is round such that it may be held by a collet or the like in the arc-machining apparatus. The portion 12 may have almost any desired shape and produce a hole of complementary shape in the workpiece. Use of the electrode 10 to cut the required die cavity in a single pass will necessitate low power input with a small gap and will therefore require a long period for the operation.

Figure 3:
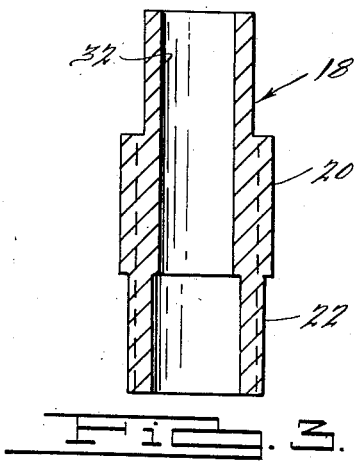
Fig. 3 is a view like Fig. 1, but of a stepped electrode of the type used with the invention herein described.

In Fig. 3, I have shown an electrode 18 having a portion 20 identical with the portion 12 of the Fig. 1 electrode and a reduced portion 22. The portion 22 has a shape similar to the portion 20, but the size thereof is uniformly smaller by a predetermined amount.

When the electrode 18 is used to machine a die cavity, the circuit of the arc-machining apparatus may be adjusted to provide a high rate of metal removal—in other words, for a roughing operation. After the portion 22 of the electrode has penetrated the workpiece to the full extent, the arc-machining cycle is momentarily interrupted and the circuit parameters are readjusted to those values normally used in achieving fine surface finish. The electrode 18 is then caused to continue its travel into or through the work, and although the rate of stock removal will be now much less than for the roughing operation, the amount of stock to be removed to attain desired dimensions is much less, so the speed of electrode travel will not be substantially altered.

By proper control of the degree or magnitude of the reduction in electrode diameter, it is possible to reduce the amount of material that must be removed by the finishing step to a true finishing operation. Thus, even though the finishing cut be made under conditions wherein the rate of stock removal is only $\frac{1}{10}$ to $\frac{1}{20}$ of that removed during the roughing cut, the length of time required for the finishing cut can be reduced to $\frac{1}{4}$ to $\frac{1}{2}$ of the time required for the roughing cut. It may be seen, therefore, that the penalty in overall machining time for producing fine surface finishes is substantially reduced over known methods.

In instances where surface finish and dimensional requirements are of the highest possible requirements, it has been found desirable to subject the electrode to a dual reduction in size, such that the smallest section performs the roughing operation, the intermediate section a semi-finishing operation, and the largest section a "super-finishing" cut with the electrical power circuit adjusted to provide the maximum surface finish obtainable.

Figure 4:
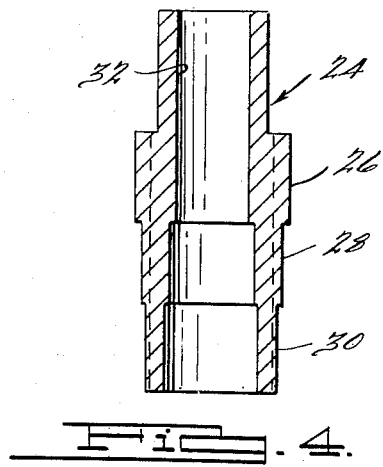
Fig. 4 is a modified form of the Fig. 3 electrode.

Fig. 4 illustrates in section such an electrode 24 which has sections 26, 28 and 30, of progressively reduced size.

Each of the electrodes shown is provided with an internal passage 32 through which coolant may be circulated during the arc-machining operation.

The desired stepped sizing of the electrode may be obtained by mechanical machining, by electrolytic action (sometimes called "deplating"), or by chemical erosion (i. e. "etching"). If either of the latter methods are used, there will be a uniform reduction in overall size of the electrode as is illustrated in Figs. 3 and 4.

While electrodes of stepped configuration have been shown and described, electrodes of conical or uniformly tapered form may be used in special cases.

It will be seen, therefore, that I have provided an improved method and means for obtaining fine surface finish and accurate size control in arc-machining operations with less consumption of time than heretofore known in the art.

It will be understood that the embodiments shown and described are by way of example only and are not to be construed as being the only possible forms that the invention may assume. The principles set forth are applicable in numerous alternate arrangements, and it is intended to limit the scope of the invention only as set forth in the appended claims.

I claim:

1. The improved method of arc-machining whereby roughing and finishing cuts are accomplished with a single pass of a single electrode through a workpiece comprising, providing an electrode of progressively increasing size along its length, passing said electrode through the workpiece, and adjusting the parameters of the power circuit to provide progressively decreasing rates of stock removal as the larger size portions of the electrode become operative.

2. The method set forth in claim 1 wherein the electrode is of stepped form.

3. In combination with arc-machining apparatus, an electrode adapted to be fed toward a workpiece for eroding the same, the operative portion of said electrode having a progressively increasing size along its length whereby the area of the eroded hole is enlarged as the electrode passes through the workpiece.

4. The combination set forth in claim 3 wherein the electrode comprises a plurality of stepped sections along its length.

5. As a new article of manufacture, an electrode adapted for electrical-discharge-machining of conductive workpieces in connection with electrical-discharge-machining apparatus having means to selectively regulate the power input to the electrode, said electrode having a progressively increasing cross-sectional area whereby selective reduction of the power input thereto as the electrode is fed toward a workpiece will cause a decreasing rate of stock removal with substantially uniform feed.

References Cited in the file of this patent

UNITED STATES PATENTS

| | | |
|---|---|---|
| 1,496,930 | Flood et al. | June 10, 1924 |
| 2,025,206 | Holslag | Dec. 24, 1935 |
| 2,034,259 | Hopkins | Mar. 17, 1936 |
| 2,650,979 | Teubner | Sept. 1, 1953 |